United States Patent
Burkland et al.

(10) Patent No.: US 7,590,890 B2
(45) Date of Patent: Sep. 15, 2009

(54) HOT-SWAP POWER CONTROLLER GENERATING SEQUENCED POWER-GOOD SIGNALS

(75) Inventors: William Andrew Burkland, Huxley, IA (US); Adolfo A. Garcia, Santa Clara, CA (US)

(73) Assignee: Micrel, Inc., San Jose, CA (US)

( * ) Notice: Subject to any disclaimer, the term of this patent is extended or adjusted under 35 U.S.C. 154(b) by 499 days.

(21) Appl. No.: 11/466,755

(22) Filed: Aug. 23, 2006

(65) Prior Publication Data

US 2008/0126814 A1    May 29, 2008

(51) Int. Cl.
*G06F 11/00* (2006.01)

(52) U.S. Cl. .............................. 714/22; 714/23; 714/24; 714/47; 324/500

(58) Field of Classification Search ................ 714/21, 714/22, 23, 24, 34, 36, 47; 324/500
See application file for complete search history.

(56) References Cited

U.S. PATENT DOCUMENTS

| | | | | |
|---|---|---|---|---|
| 5,446,403 A | * | 8/1995 | Witkowski | 327/143 |
| 6,768,222 B1 | * | 7/2004 | Ricks | 307/32 |
| 6,988,214 B1 | * | 1/2006 | Verdun | 713/320 |
| 2002/0002651 A1 | * | 1/2002 | MacLaren et al. | 714/5 |
| 2004/0046457 A1 | * | 3/2004 | Dumont et al. | 307/72 |
| 2004/0128571 A1 | * | 7/2004 | Saunders et al. | 713/300 |
| 2005/0046440 A1 | * | 3/2005 | Phillips | 324/771 |
| 2005/0132236 A1 | * | 6/2005 | Srinivasan et al. | 713/300 |
| 2005/0180065 A1 | * | 8/2005 | Chapuis | 361/18 |

* cited by examiner

*Primary Examiner*—Robert Beausoliel
*Assistant Examiner*—Joseph D Manoskey
(74) *Attorney, Agent, or Firm*—Patent Law Group LLP (57) ABSTRACT

A power controller system is described herein, where a power-good signal (PWRGD) is asserted followed by a slightly delayed power-good signal (DLY_PWRGD) upon the system powering up. This PWRGD signal indicates that good power is being supplied to the card or other equipment, and the delayed signal tells a system processor that it is now ok to communicate with the card or other equipment. This delay allows the card or other equipment to reach a steady state condition before being declared operational by the power controller. When powering down the equipment, the DLY_PWRGD signal is first deasserted and power is decoupled from the card or other equipment. The PWRGD signal is then deasserted after a short delay. This short delay allows circuitry within the card to be properly shut down by, for example, carrying out a shutdown routine, using stored charge in the card to temporarily power the card. A state machine is used to carry out the four-state power up and power down sequence.

18 Claims, 6 Drawing Sheets

HOT-SWAP POWER CONTROLLER GENERATING SEQUENCED POWER-GOOD SIGNALS

FIELD OF INVENTION

This invention relates to power controllers for controlling and sensing power to electronic components and, in particular, to a hot-swap controller that allows electronic components, such as circuit boards, to be added, removed, or replaced within a system without removing power from other electronic components in the system.

BACKGROUND

An example of the use of a hot-swap power controller is in a server, where expansion cards may be added by inserting the cards into empty slots in the server. The cards have terminals that mate with terminals in the slot. The mated terminals pass information to and from the card as well as supply power to the card. Typical voltages supplied to the slot power terminals are 12 volts and 3.3 volts.

One or more power controller ICs selectively couple the 12 volt and 3.3 volt power supply voltages to the corresponding slot terminals based on whether certain conditions are met. For example, the power supply voltages should only be applied to the slot terminals if: 1) there is a card inserted into the slot; 2) the supply voltages are at their proper levels; and 3) there is no fault condition, such as an over-current. Typically, if these conditions are met, which may be determined in a matter of milliseconds, the power controller couples, or continues to couple, the power supply voltages to the slot.

Once the above conditions are met, power controllers typically generate a single "power-good" signal for application to an external system processor that is used to convey that the power system is working properly. The power-good signal indicates to the external system processor that it is now okay to communicate with the card since the card is receiving the proper power.

However, some cards require some finite time after the power-good signal is asserted before the card is stable and fully operational. For example, a voltage regulator in the card may need on the order of 100 ms to reach a steady state operating condition. Similarly, capacitors and other energy storing devices in the card may need time to fully charge before the card is fully operational. Further, there may be routines that the card must first carry out before being ready to communicate with the external system. Therefore, there is a period between when the power-good signal is asserted and when the card is ready to properly operate. Using the card within this period may cause errors in the card's processing.

Further, if the card is up and running and it is detected that any one of the above conditions not being met, the typical power controller then instantly removes power from the card and simultaneously deasserts the power-good signal, preventing the system from further communicating with the card. Such abrupt termination of control to the cards may not allow the card to properly shut down.

The above problems are also applicable in many other situations not relating to cards in a slot.

It is desirable to improve the performance of an electronic system where a power-good signal generated by a power controller is used to signal to an external processor that satisfactory power is applied to certain equipment.

SUMMARY

A power controller system is described herein, which may consist of one or more ICs and other components. The power controller selectively couples power supply voltages to electrical equipment, such as a card that has been inserted into an expansion slot in a server. Instead of simply generating a one-bit power-good signal, the power controller provides a two-bit signal conveying four states. The four state signal is used by external control circuitry to more efficiently and more reliably control the card or other equipment powered by the power controller.

Upon the electrical equipment powering up, and if the power to the equipment is deemed satisfactory by the power controller, the power controller asserts a power-good signal (PWRGD) followed by asserting a slightly delayed (e.g., 50-300 ms) power-good signal (DLY_PWRGD). Upon powering up, the PWRGD signal indicates that good power is being supplied to the card or other equipment, and the DLY_PWRGD signal tells a system processor that it is now ok to communicate with the card or other equipment. This delayed signal allows the card or other equipment to reach a steady state condition before being declared by the power controller as being fully operational. Since the card reaches a steady state of operation before the card is "authorized" to process data, the processing of data by the card is highly reliable. If the card were used for processing data while powering up, errors may result.

When the equipment is powered down, such as when a fault signal or other shut down signal is detected, the DLY_PWRGD signal is first deasserted, causing power to be decoupled from the card. This is followed by the deassertion of the PWRGD signal after a short delay (e.g., 0.5 ms-10 ms). Although power was decoupled from the card upon the DLY_PWRGD signal being deasserted, filter capacitors in the card still have stored charge. Such stored charge is sufficient to power the card for a short time to enable the card to perform a shut down routine, such as saving data. Delaying the PWRGD signal allows circuitry within the card to properly shut down. The external circuitry treats the deassertion of the DLY_PWRGD signal during shut down as an indication that the card is being shut down, and the deassertion of the PWRGD signal indicates to the external circuitry that the card is presumed to be no longer operating. Therefore, the external circuitry is given a short time to properly shut down the card.

A state machine is used to carry out the four-state power up and power down sequence and issue the two-bit signal (PWRGD and DLY_PWRGD) for used by external circuitry to control the card or other equipment powered by the power controller.

Other embodiments are described.

DETAILED DESCRIPTION

Figure 1:
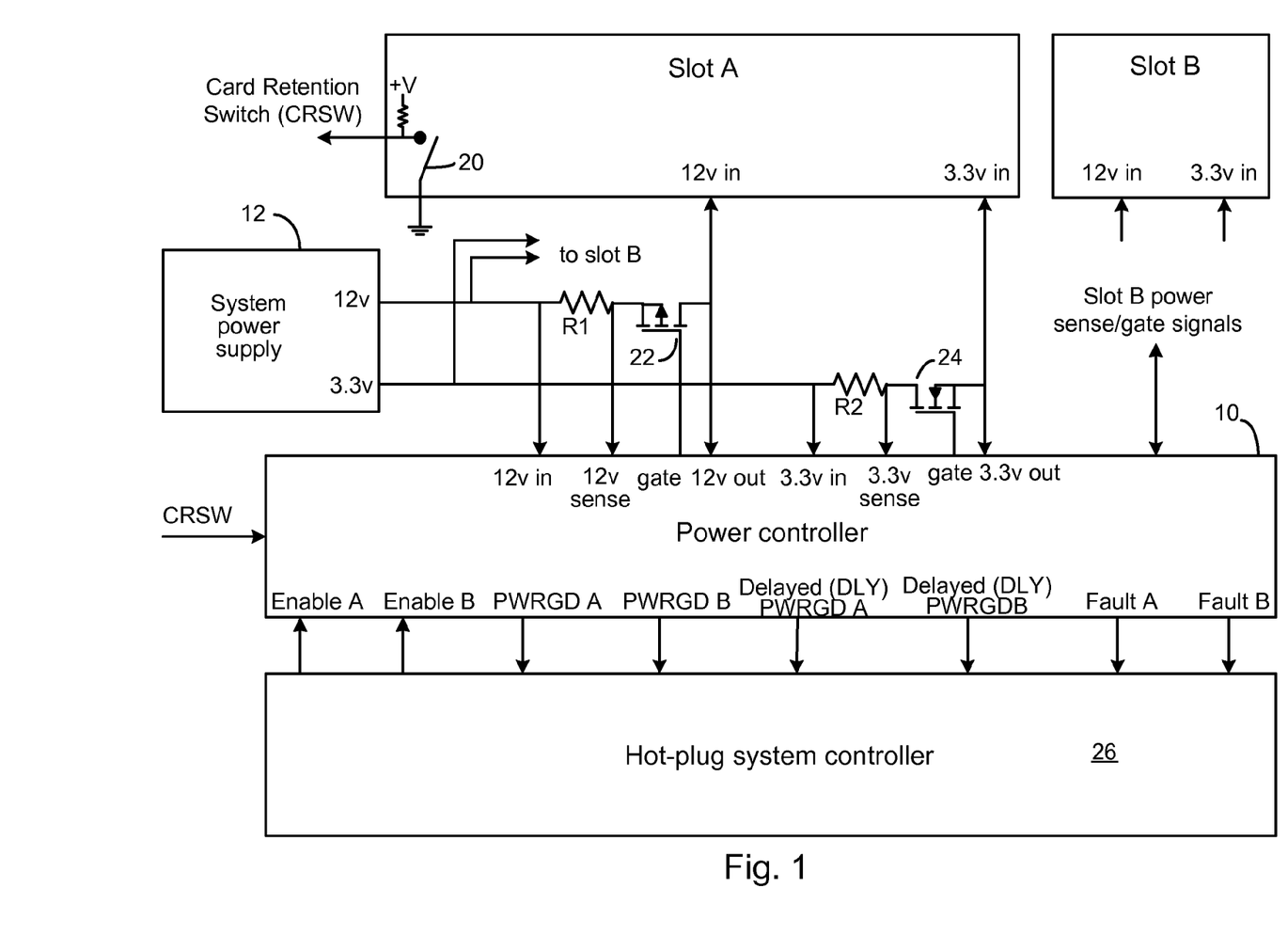
FIG. 1 illustrates a power controller controlling power to two slots in an expandable server or other equipment in accordance with one embodiment of the invention.

FIG. 1 illustrates a power controller 10 controlling power from a system power supply 12 to power terminals in two slots (A and B) in a server or other equipment. The controller 10 may be a single integrated circuit (IC). In the example described herein, the controller 10 is used as a dual-slot power controller supporting the power distribution requirements for Peripheral Component Interconnect Express (PCI Express) Hot-Plug compliant systems. The power controller 10 provides power control support for two PCI Express slots, requiring 12 volt and 3.3 volt power. Although the PCI Express standards also call for an auxiliary 3.3 volt supply, the circuitry for supplying this auxiliary power is not described herein since it is unnecessary for a full understanding of the invention.

Figure 2:
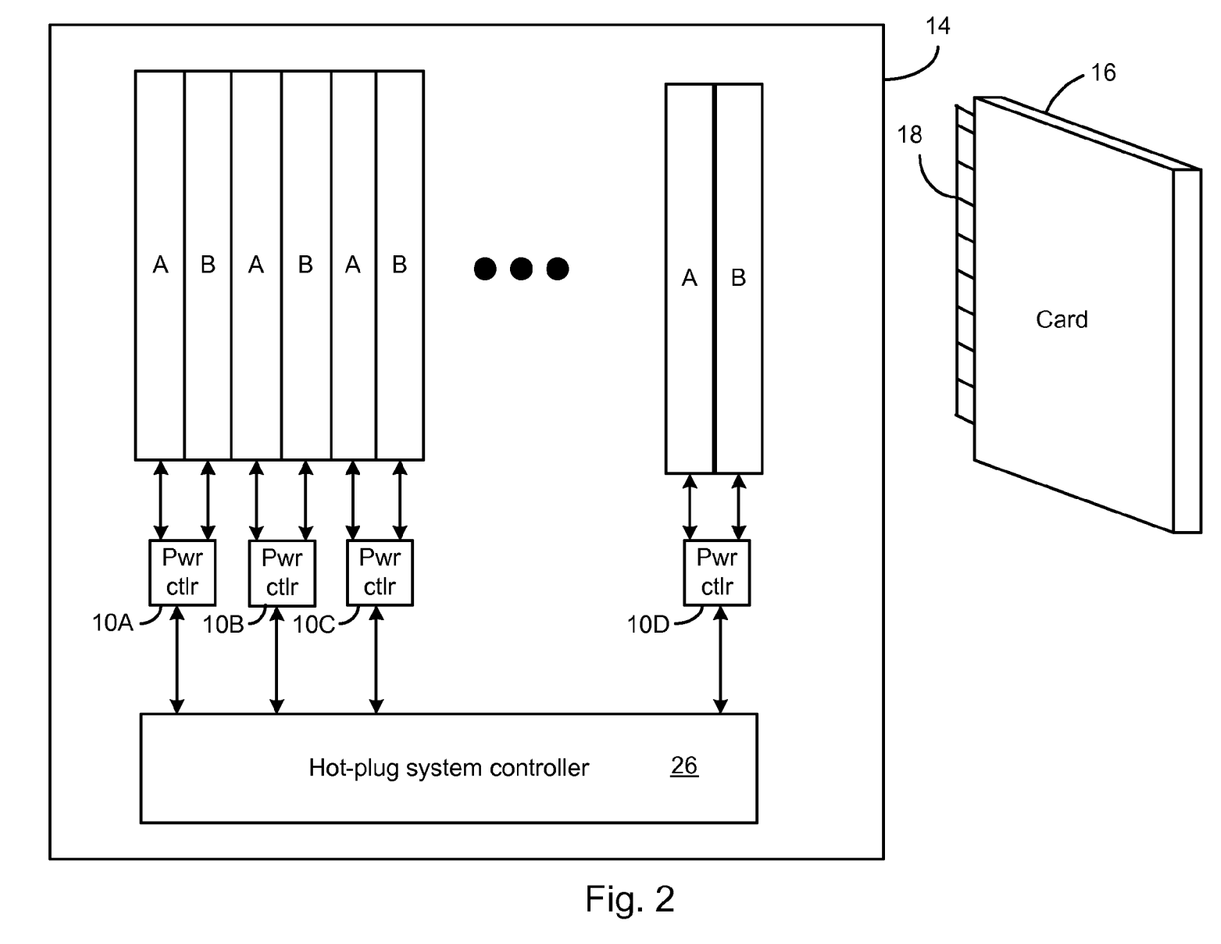
FIG. 2 illustrates many dual-slot power controllers connected to slots in an expandable server or other equipment in accordance with one embodiment of the invention.

FIG. 2 illustrates how a separate power controller 10A-D controls power to two slots A and B in a server 14. An expansion card 16, containing a printed circuit board and circuitry for operation of the server 14, is inserted into a slot when necessary for expanding the capability of the server. Accordingly, the slots are referred to as expansion slots. The cards 16 have metal terminals 18 that mate with corresponding terminals in a slot for coupling power to the card 16 and for interfacing with the server/system processor. The cards 16 may be removed or inserted while the server 14 is operating, without affecting the cards in the other slots. This is referred to a hot-swapping.

In the described example, power is automatically applied to the associated 12 volt and 3.3 volt power terminals of the slot only when it is detected that a card 16 has been inserted into the slot and other conditions, described below, are met.

Referring back to FIG. 1, each slot includes a microswitch or other sensor (both generically referred to as a card retention switch) that is triggered by the card 16 being inserted into a slot. FIG. 1 shows a card retention switch (CRSW) 20 that is physically pushed closed by the action of the card 16 being inserted into slot A or by card retainer clips being secured. The closing of switch 20 causes a CRSW signal to go from a logical high to a logical low to signal to the power controller 10 that MOSFETs 22 and 24 should be closed to apply the 12 volt and 3.3 volt power to the slot if all other required conditions (e.g., an adequate power supply voltage) are met.

The controller 10 detects, for the 12 volt and 3.3 volt paths, at least the following: the input voltage from the power supply 12, a sense voltage whose value is a product of the current through a sense resistor R1 or R2, and the voltage actually applied to the slot terminal.

An over-current through the sense resistor R1 or R2 is detected by applying the input voltage (12v in or 3.3v in) from the power supply 12, minus an offset voltage, to one input of a hysteretic comparator. The other input of the hysteretic comparator is connected to the sense voltage (12v sense or 3.3 v sense). If the sense voltage drops below a threshold, this signals an over-current condition, and a fault signal is generated for that slot.

The controller 10 also compares the 12 v out and 3.3v out voltages actually applied to the slot terminals to a minimum threshold to determine if there is a power good (PWRGD) condition. Additionally, the controller 10 determines if the input voltage from the power supply 12 is above a threshold. If not, an undervoltage lockout (UVLO) signal is generated.

A hot-plug system controller 26 shown in FIGS. 1 and 2 represents any system processor or other circuitry that receives signals from the power controller 10 and controls other aspects of the system based on those signals. The hot-plug system controller 26 may be a system processor for the server or other device. The hot-plug system controller 26 generates an enable signal for each slot (enable A or B) to reset the fault logic circuitry in the power controller 10 after a fault condition has been fixed. The enable signal may be toggled by the system for any reason to decouple power from the slots, such as a shut down of the system.

If the CRSW signal indicates a card 16 is in the slot, and there are no fault signals, and the power controller 10 is enabled for that slot, then the power controller 10 closes or keeps closed the MOSFETs 22 and 24 for the associated slot.

The circuitry shown in FIG. 1 also exists for the slot B but the circuitry for slot B is not shown for simplicity.

In certain types of cards, there is a short period between when power is applied to the card (i.e., when MOSFETs 22 and 24 are closed) and when the card is fully functional. For example, a card may have voltage regulators that take some time to ramp up to their final voltage, or storage devices, such as capacitors, that may need to first be charged for the proper operation of the card.

Figure 3:
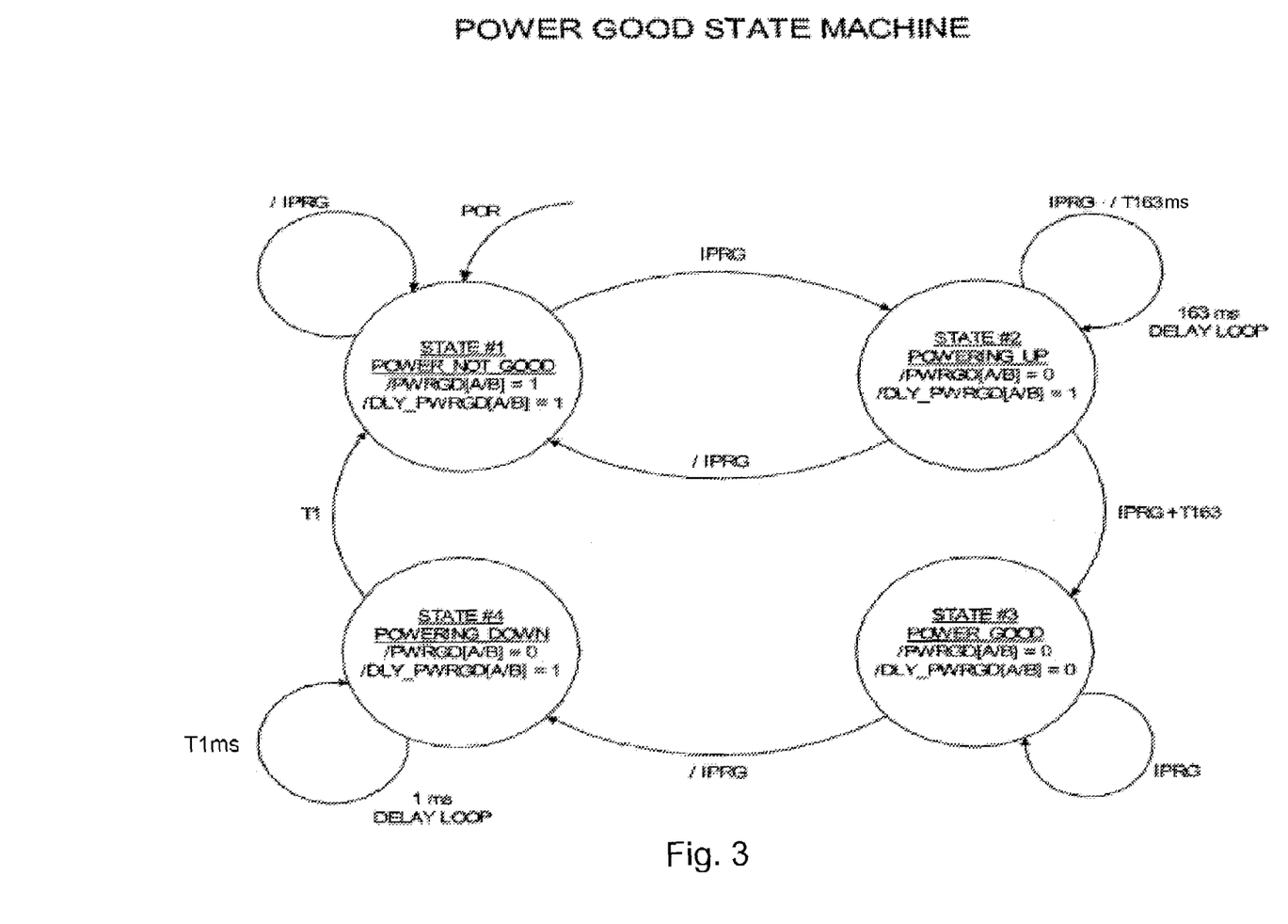
FIG. 3 illustrates four states of a state machine for powering up or powering down individual slots in accordance with one embodiment of the invention.
Figure 4:
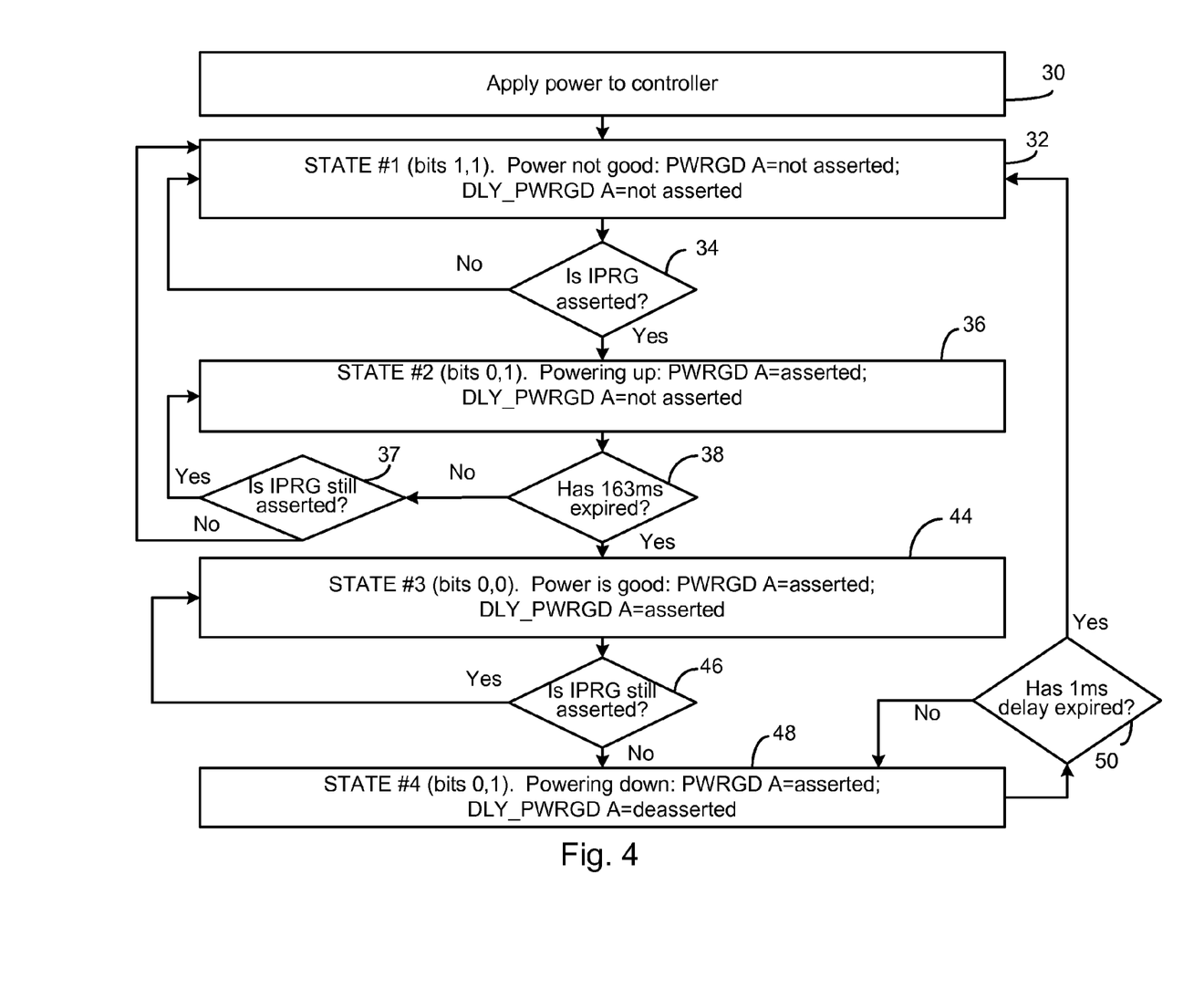
FIG. 4 is a flowchart identifying the steps taken by the state machine of FIG. 3.

FIG. 3 illustrates a state machine in the power controller 10 that controls certain operations of the power controller 10. FIG. 4 is a flowchart that also illustrates the states of the state machine. The state machine has a two-bit output that provides a power-good (PWRGD) signal (first bit) and a delayed power-good (DLY_PWRGD) signal (second bit) for each slot A and B. These outputs are shown in FIG. 1 and are applied to the hot-plug system controller 26. A logical 0 PWRGD signal indicates that the output voltage applied to the slot is above the threshold and there is no fault associated with that slot. This logical 0 state of the PWRGD signal is referred to as being an asserted PWRGD signal. A logical 1 PWRGD signal indicates that either the output voltage applied to the slot is below the threshold or that there is a fault associated with that slot. This logical 1 state of the PWRGD signal is referred to as being a deasserted or not asserted PWRGD signal. The logic level associated with an asserted or deasserted signal may also be the opposite.

Upon powering up of the card or other equipment, after the MOSFETs 22 and 24 have been turned on, the externally outputted PWRGD signal is asserted when an internal power-good (IPRG) signal is asserted by the power controller 10. The IPRG signal state is determined by the logical ANDing of the power-good indicators (voltage to card above threshold, no undervoltage, no fault, no over-temperature, etc.) and the enable signal that enables the channel.

The PWRGD signal is output from the power controller 10 and applied to an external processor (e.g., the hot-plug system controller 26 in FIG. 1) so that the external processor knows the state of the power and can used the signal for any purpose applicable to the system when the slot is powering up. Upon powering up, the DLY_PWRGD signal is asserted sometime after the PWRGD signal is asserted (e.g., after a 163 ms delay). The DLY_PWRGD signal is output from the power controller 10 and applied to the external processor so that the external processor knows when it is okay to begin communicating with the card in the slot. In other words, upon assertion of the DLY_PWRGD, the power controller 10 is telling the system that the card is fully operational.

Upon powering down of the card or other equipment, the deassertion of the DLY_PWRGD signal corresponds with the MOSFETs 22 and 24 being switched off.

Additional detail is presented below.

Powering Up and Powering Down Routine

In the flowchart, which follows the states of the state machine in FIG. 3, it is assumed that power has just been applied to the power controller 10 (step 30 of FIG. 4). A power on reset (POR) signal, shown in FIG. 3, is a signal internal to the power controller that serves to initialize the state of the controller 10 upon first being powered up.

In FIG. 3, the first state of the state machine in the power controller 10 is shown as STATE #1. In this STATE #1, the IPRG signal is not asserted. The IPRG signal may not be asserted for any number of reasons, such as the controller 10 still powering up, a fault condition existing, a card not being inserted into a slot, or other reason. As an example, prior to a card being inserted into slot A or after a fault condition for slot A, the MOSFETs 22 and 24 in FIG. 1 are off so the output voltage to the slot (either 12 volts or 3.3 volts) is below a minimum threshold for a power good condition. Accordingly, the IPRG signal and the PWRGD signal are not asserted (i.e., PWRGD signal is a logical 1). The DLY_PWRGD signal will also be not asserted. This is illustrated in FIG. 3 and shown in step 32 of FIG. 4, where the two-bit output of the step machine is 1.1.

The external circuitry that receives the two-bit signal from the controller 10 suitably processes the bits to control communications with the card or perform any other operation.

FIG. 3 shows a /IPRG state associated with STATE #1, where the nomenclature /IPRG indicates that the IPRG signal is not asserted. The /IPRG loop indicates that there is clocking of logic circuits and sampling of the various voltage levels. Eventually, the controller 10 will power up, or any fault will be fixed, and/or a card will inserted into slot A. After any fault is fixed, the system will generate an enable signal for the slot to reset the fault flags in the power controller 10. When the power controller 10 is enabled and if the CRSW signal is sensed, the power controller 10 will begin a powering up state by closing MOSFETs 22 and 24 (FIG. 1) to provide power to slot A.

Upon the output voltage to the slot A being above the threshold, and no faults being detected, the IPRG signal is asserted (step 34), causing the PWRGD signal to be asserted. The DLY_PWRGD signal is delayed 163 ms after the PWRGD signal so is not yet asserted. The two-bit output of the state machine during this time is 0.1 (step 36). This is STATE #2. Even though adequate power is supplied to the card, the system is still not authorized by the power controller 10 to begin communicating with the card since the DLY_P-WRGD signal is still not asserted in STATE #2. The 163 ms delay time gives the card time to fully power up and be fully operation before the system is authorized to communicate with the card. Other suitable delay times may also be used, such as 50 ms-300 ms, depending on the particular application. The delay time may even be programmable. The state machine stays in STATE #2 until the DLY_PWRGD signal is asserted or the IPRG signal is deasserted.

If the IPRG signal is deasserted during STATE#2, the state machine reverts back to STATE #1 (step 37).

After the 163 ms delay (step 38), the DLY_PWRGD signal will be asserted, and the two-bit output of the state machine will be 0.0, corresponding to STATE #3 (step 44). The external system uses the asserted DLY_PWRGD signal as an indication that the card is ready to communicate with the system. The DLY_PWRGD signal takes the place of the PWRGD signal in prior art systems, whose power controllers generated no delayed power-good signals. Therefore, a hot-swap system using the present invention may use the DLY_PWRGD signal from power controller 10 instead of the prior art PWRGD signal to indicate to the system that the card is fully operational.

The state machine remains in STATE #3 until there is a fault, or the system deasserts the enable signal to the power controller 10, or the card retention switch is triggered by the user unlatching card retention clips. During STATE #3, the system is communicating with the card, and the IPRG signal remains asserted (step 46).

When a fault or a disable signal is detected, the IPRG signal is immediately deasserted (/IPRG) (step 46). The power controller 10 must now enter a power down routine for the slot. The deasserted IPRG signal causes the DLY_PWRGD signal to immediately be deasserted (logical 1), and the state machine enters STATE #4 (step 48), causing its output to be 0.1. Deassertion of the IPRG signal immediately causes the controller 10 to turn off the MOSFETs 22 and 24 in FIG. 1 to decouple power to the slot. The deassertion of DLY_PWRGD indicates to the hot-plug system controller 26 that power is being removed from the card. The PWRGD signal in the powering down routine is delayed 1 ms from the DLY_P-WRGD signal (step 50).

It is assumed that filter capacitors in the card can power the card at least 1 ms after the MOSFETs 22 and 24 have been turned off. The card can typically perform a shutdown routine within the 1 ms period. The external circuitry receiving the two-bit signal from the controller 10 can use the STATE #4 to properly shut down the card, such as by saving data in a memory. Other suitable delay times may also be used, such as 0.5 ms-10 ms, depending on the particular application. The delay time may even be programmable.

After the 1 ms delay (step 50), both the DLY_PWRGD and PWRGD signals are deasserted (the output of the state machine is 1.1), and the state machine enters STATE #1 (step 32).

Accordingly, a powering up and powering down sequence, conveyed by a two-bit signal, has been described that improves the operation of a system incorporating the power controller of the present invention. One skilled in the art can easily design software or hardware that senses the two-bit signal and performs the functions described herein. The polarities of all logic signals may be inverted (i.e., an asserted signal may be a 1 or a 0), and delay times other than those given in the example may be different for different applications. Additionally, the generation of the IPRG signal need not be based on all the conditions provided in the example.

Figure 5A:
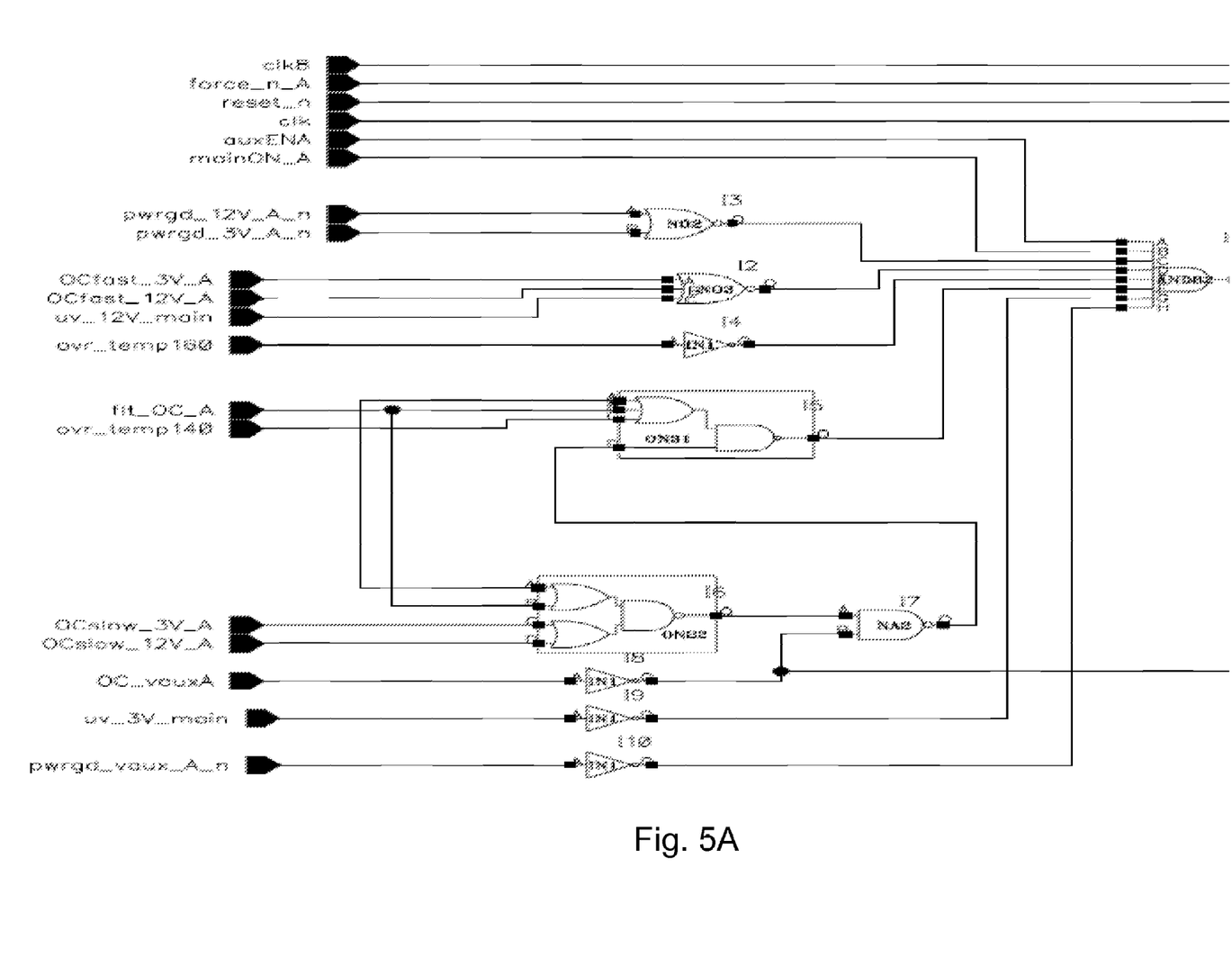
FIGS. 5A and 5B, when combined, illustrate a logic circuit that may be used to generate the power-good and delayed power-good signals in accordance with one embodiment of the invention.
Figure 5B:
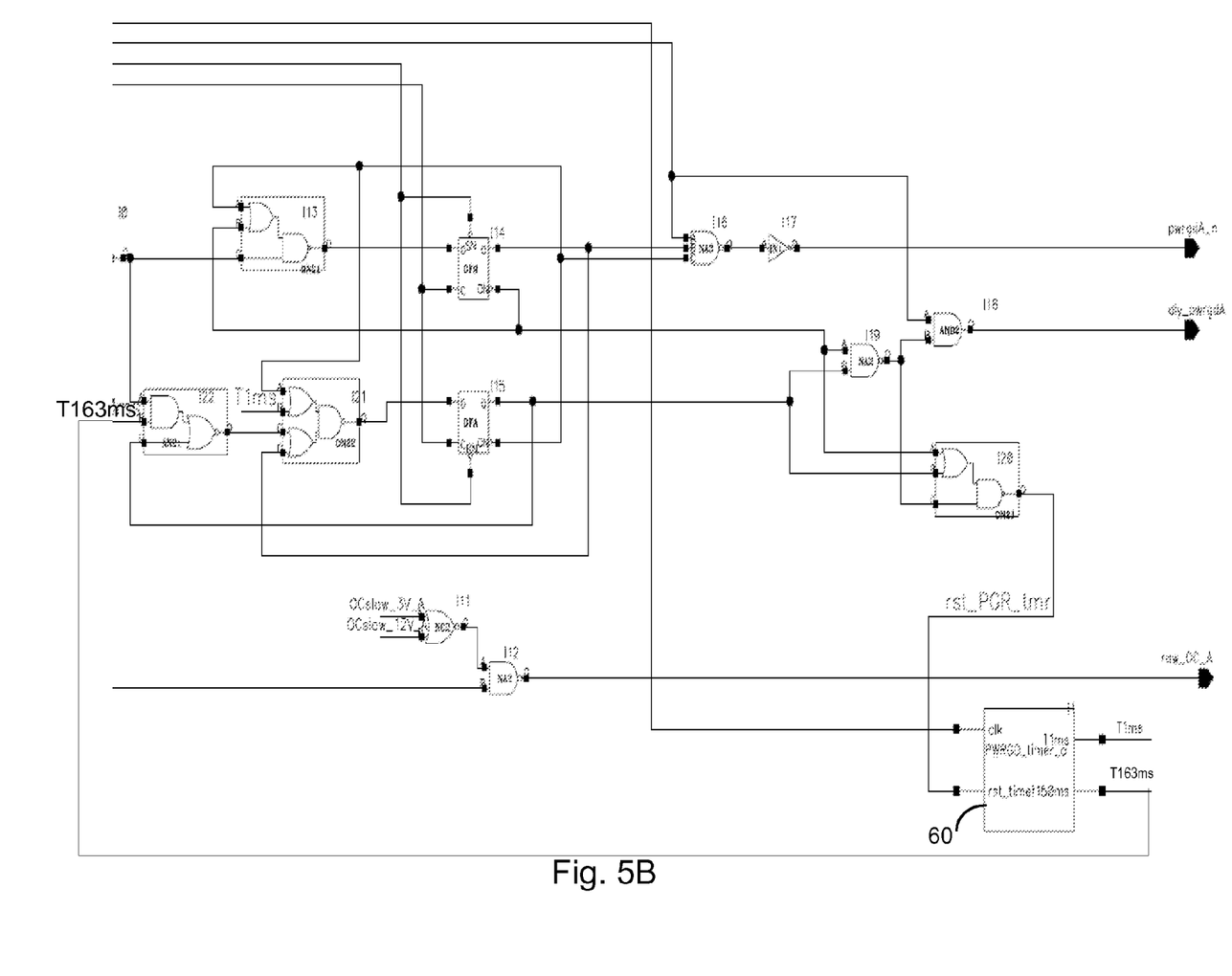

FIGS. 5A and 5B, when placed side by side, illustrate a logic circuit used in the power controller 10 to generate the PWRGD and DLY_PWRGD signals for a single slot (slot A) for application to an external processor. The PWRGD and DLY_PWRGD signals are shown at the right side of FIG. 5B as pwrgdA and dly pwrgdA. The inputs to the logic circuit are identified on the left side of FIG. 5A. The inputs include various additional signals not described herein since such inputs are a matter of design choice and do not add to the understanding of the present invention. The additional inputs include clock signals, a force signal for diagnostic purposes to defeat all protections, auxiliary 3.3 v power-good signals, and fast and slow overcurrent (OC) detection signals where the slow OC allows for minor current surges.

One novel aspect of the logic circuitry is the use of a single timer 60 (FIG. 5B) that generates both the 1 ms delay signal for STATE #4 in FIG. 3 and the 163 ms delay in STATE #2. The delayed pulses are connected back into the state machine to indicate when the period has elapsed. One timer 60 can be used since both delayed signals are not needed at the same time. This saves die size. The timer 60 is a ripple counter with dual outputs, one output outputting a pulse delayed by 1 ms after releasing the reset pulse when the logic is in STATE #4, and the other output outputting a pulse delayed by 163 ms after releasing the reset pulse when the logic is in STATE #2. The longer period is the output of the last stage of the ripple counter, and the shorter period output is taken from an intermediate stage. Ripple counters are well known and consist of a series of T flip flops where the inverted Q output of an upstream flip flop is connected to the clock terminal of the next flip flop, and the T inputs are set to a logical 1. The clock signal ripples through the flip flops, generating longer and longer switching delays by downstream flip flips. The number of flip flops needed for a particular delay depends on the original clock frequency.

Many other logic circuits may perform the same logical function as the circuit of FIGS. 5A and 5B.

Having described the invention in detail, those skilled in the art will appreciate that given the present disclosure, modifications may be made to the invention without departing from the spirit and inventive concepts described herein. Therefore, it is not intended that the scope of the invention be limited to the specific embodiments illustrated and described.

What is claimed is:

1. A power control system comprising:
    a control terminal for connection to a switch for selectively coupling a power supply voltage to an electrical device;
    fault detection circuitry for receiving sense signals indicating any fault in delivery of the power supply voltage to the electrical device, the fault detection circuitry generating fault indication signals;
    internal power good (IPRG) circuitry for detecting that power to the electrical device is satisfactory and there are no fault indication signals and, in response, asserting an IPRG signal;
    first circuitry for asserting a power-good signal, for application to second circuitry, when the IPRG signal is asserted; and
    a first delay circuit for delaying the power-good signal and generating a delayed power good signal, wherein an asserted delayed power-good signal indicates to the second circuitry that the electrical device should be operational,
    wherein the first circuitry and the first delay circuit apply the power-good signal and the delayed power-good signal to the second circuitry upon the electrical device powering up, and wherein, upon powering down of the electrical device, the first circuitry changes a state of the delayed power-good signal, the system further comprising:
    a second delay circuit that delays a transition of the power-good signal until sometime after the delayed power-good signal has changed states.

2. The system of claim 1 wherein the first delay circuit forms part of a state machine.

3. The system of claim 1 wherein the control terminal, the fault detection circuitry, the IPRG circuitry, the first circuitry, and the first delay circuit are part of a power controller integrated circuit.

4. The system of claim 3 wherein the second circuitry is external to the power controller.

5. The system of claim 1 further comprising the second circuitry that receives the power-good signal and the delayed power-good signal, wherein the second circuitry is configured to authorize communication with the electrical device only after receiving the delayed power-good signal.

6. The system of claim 5, wherein the second circuitry comprises a processor.

7. The system of claim 1 wherein the fault detection circuitry comprises overcurrent and undervoltage detection circuitry.

8. The system of claim 1 wherein the first circuitry and the first delay circuit comprise a logic circuit, the logic circuit receiving signals from at least the fault detection circuitry and the IPRG circuitry and generating the power-good signal and delayed power good signal.

9. The system of claim 1 wherein a delay by the second delay circuit is between approximately 0.5 ms and 10 ms to allow the electrical equipment to perform a shutdown routine.

10. The system of claim 1 wherein the first delay circuit and the second delay circuit are part of a single ripple counter.

11. The system of claim 1 wherein the first circuitry, first delay circuit, and second delay circuit comprise a four-state state machine whose output comprises the power-good signal and the delayed power-good signal, wherein a first state is a power not good state with the power-good signal and the delayed power-good signal both not asserted, wherein a second state is a powering up state with the power-good signal asserted and the delayed power-good signal not asserted, wherein a third state is a power-good state with the power-good signal and the delayed power-good signal both asserted, wherein a fourth state is a powering down state with the power-good signal asserted and the delayed power-good signal not asserted, and wherein the state machine returns to the first state after a delay wherein the power-good signal becomes deasserted.

12. The system of claim 1 further comprising a retention switch signal that is asserted when the electrical device is installed in a receiving station, the retention switch signal being received by the power control system for causing the control terminal to output a control signal to couple the power supply voltage to the electrical device.

13. The system of claim 12 wherein the electrical device is a card and the receiving station is a slot into which the card is inserted, the slot having terminals that receive the power supply voltage when the control terminal control signal causes the power supply voltage to be coupled to the card.

14. The system of claim 1 wherein the first delay circuit delays the power-good signal by between 50 ms and 300 ms.

15. A power controller comprising:
    a control terminal for connection to a switch for selectively coupling a power supply voltage to an electrical device;
    fault detection circuitry for receiving sense signals indicating any fault in delivery of the power supply voltage to the electrical device, the fault detection circuitry generating fault indication signals;
    internal power good (IPRG) circuitry for detecting that power to the electrical device is satisfactory and there are no fault indication signals and, in response, asserting an IPRG signal;
    first circuitry for asserting a power-good signal, for application to second circuitry, when the IPRG signal is asserted;
    a first delay circuit for delaying the power good signal and generating a delayed power good signal for application to the second circuitry;
    the power good signal and the delayed power good signal for being applied to second circuitry, wherein an asserted delayed power good signal indicates to the second circuitry that the electrical device should be operational, wherein the first circuitry and the first delay circuit apply the power-good signal and the delayed power-good signal to the second circuitry upon the electrical device powering up, wherein, upon powering down of the electrical device, the first circuitry deasserts the delayed power-good signal, the system further comprising a second delay circuit that delays deassertion of the power-good signal upon powering down of the electrical device until sometime after the delayed power-good signal has been deasserted; and wherein the first circuitry, first delay circuit, and second delay circuit comprise a four-state state machine whose output comprises the power-good signal and the delayed power-good signal, wherein a first state is a power not good state with the power-good signal and the delayed power-good signal both not asserted, wherein a second state is a powering up state with the power-good signal asserted and the delayed power-good signal not asserted, wherein a third state is a power-good state with the power-good signal and the delayed power-good signal both asserted, wherein a fourth state is a powering down state with the power-good signal asserted and the delayed power-good signal not asserted, and wherein the state machine returns to the first state after a delay wherein after the delay the power-good signal becomes deasserted.

16. The system of claim 15 wherein the power controller system is constructed as a single packaged integrated circuit.

17. The system of claim 15 wherein the first delay circuit delays assertion of the delayed power-good signal between approximately 50 ms and 300 ms after the power-good signal has been asserted, and wherein second delay circuit delays deassertion of the power-good signal between approximately 0.5 ms and 10 ms after the delayed power-good signal has been deasserted.

18. A power control method comprising:

controlling a switch to selectively couple a power supply voltage to an electrical device;

receiving sense signals by fault detection circuitry for indicating any fault in delivery of the power supply voltage to the electrical device, the fault detection circuitry generating fault indication signals;

detecting that power to the electrical device is satisfactory and there are no fault indication signals and, in response, asserting an internal power good (IPRG) signal;

asserting a power-good signal by first circuitry when the IPRG signal is asserted;

delaying the power good signal by a first delay circuit and generating a delayed power good signal upon the electrical device powering up;

deasserting the delayed power-good signal upon powering down of the electrical device;

upon powering down of the electrical device, delaying deassertion of the power good signal by a second delay circuit so that the delayed power-good signal is deasserted before the power-good signal is deasserted; and wherein the first circuitry, first delay circuit, and second delay circuit comprise a four-state state machine whose output comprises the power-good signal and the delayed power-good signal, wherein a first state is a power not good state with the power-good signal and the delayed power-good signal both not asserted, wherein a second state is a powering up state with the power-good signal asserted and the delayed power-good signal not asserted, wherein a third state is a power-good state with the power-good signal and the delayed power-good signal both asserted, wherein a fourth state is a powering down state with the power-good signal asserted and the delayed power-good signal not asserted, and wherein the state machine returns to the first state after a delay wherein after the delay the power-good signal becomes deasserted.

* * * * *